April 2, 1935.  R. ST. PIERRE  1,996,443
FOOD SEVERING AND DICING DEVICE
Filed July 21, 1934   2 Sheets-Sheet 1
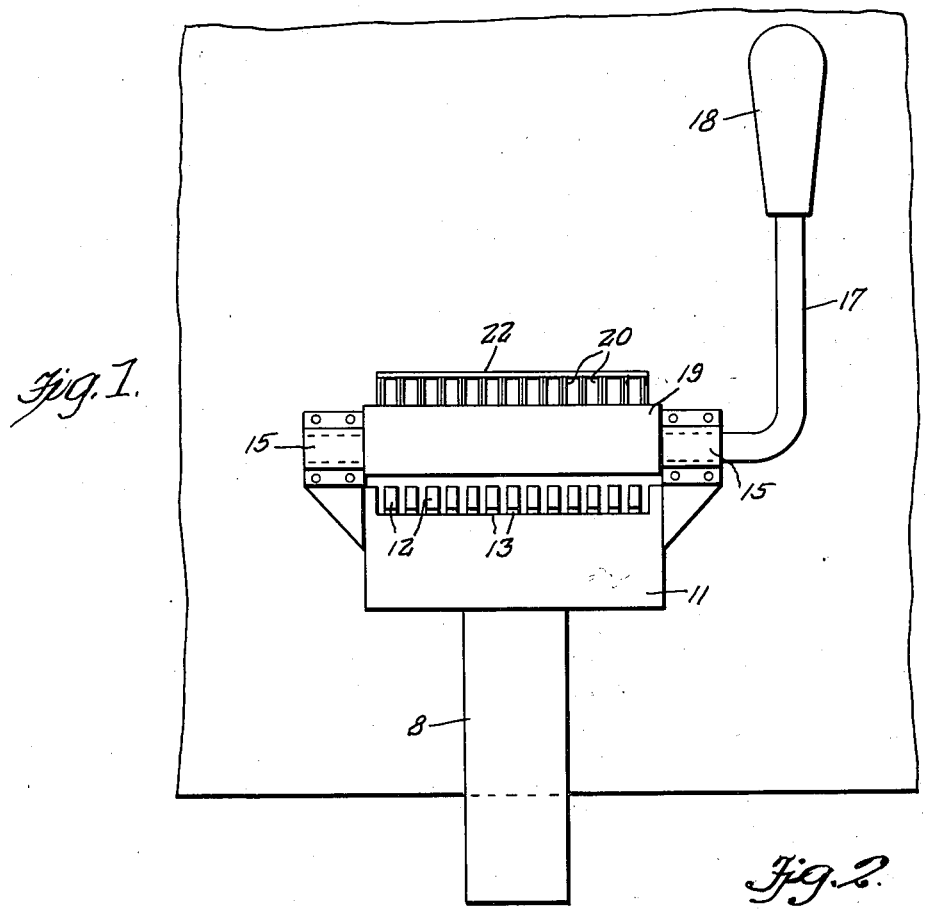
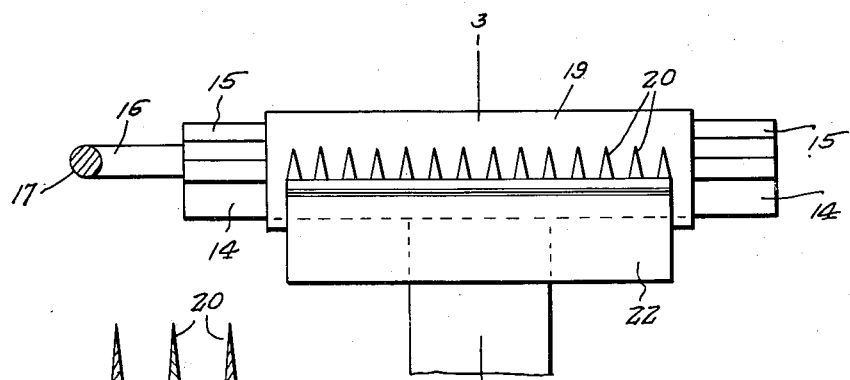
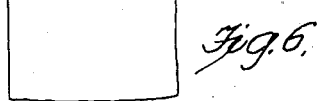
Inventor
*Rosario St Pierre,*
By *Clarence A O'Brien*
Attorney

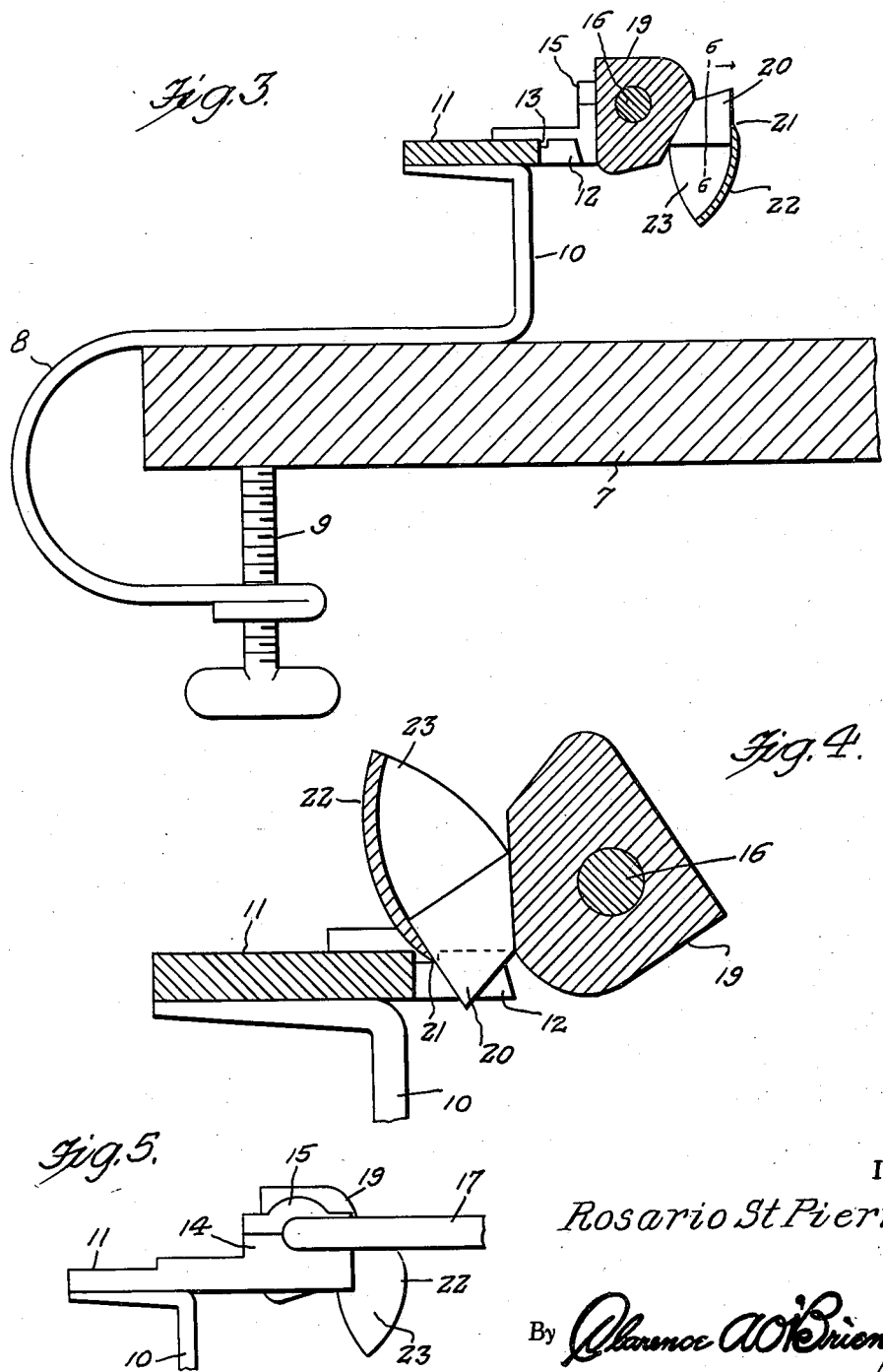

Patented Apr. 2, 1935

1,996,443

UNITED STATES PATENT OFFICE 1,996,443

FOOD SEVERING AND DICING DEVICE

Rosario St. Pierre, Three Rivers, Quebec, Canada

Application July 21, 1934, Serial No. 736,392

2 Claims. (Cl. 146—141)

This invention relates to a device such as may be conveniently referred to as a kitchen accessory expressly constructed and designed for slicing vegetables and meat into relatively small cube-like portions such as is done with so-called dicing machines.

My primarily aim is to generally improve upon devices of this general classification by providing a structure which is simple, economical and otherwise efficient in fulfilling the requirements of a practical and successful construction.

The particular details selected for carrying the ideas into actual practice will become more readily apparent from the following description and drawings.

In the drawings:

Figure 1 is a top plan view of the device showing it attached to a table or the like and disclosing the platen, its toothed matrix forming edge and the cutting means swung back to an out of the way position to facilitate placement of the products to be severed.

Figure 2 is an elevational view looking at the assemblage shown in Figure 3, that is in a direction from right to left.

Figure 3 is a central vertical sectional view taken approximately on the plane of the line 3—3 of Figure 2.

Figure 4 is a view like Figure 3 with the parts slightly enlarged showing the balanced two-way cutting means swung over to operative position.

Figure 5 is an end elevational view, that is looking at Figure 2 in a direction from left to right and Figure 1 in a direction from right to left.

Figure 6 is a fragmentary detail sectional view taken somewhat on the plane of the line 6—6 of Figure 3.

Referring now to the drawings by distinguishing reference characters I call attention to Figures 1 and 3 wherein it will be observed that the numeral 7 designates a table or shelf or the like to which the attaching clamp 8 is detachably connected by a set screw 9. The clamp is shown as provided with an upright 10 to support the dicing device in elevated position above the table. The principal novelty is of course predicated upon the particular construction of the dicing device.

This comprises a longitudinally elongated or rectangular plate 11 which may be conveniently referred to as a rest or platen on which the food is placed. Incidentally the expression "food" is intended to comprehend vegetables, meat, cheese or the like. The severing edge portion of the platen is formed with a plurality of lug like extensions 12 which may be conveniently denoted as teeth 12. These are formed with clearance notches 13. This assembly of teeth is in a sense a matrix in that it serves to define the shapes of the cut particles of food allowing them to drop down on the table or into a suitable collection receptacle. In Figure 5 it will be noticed that the opposite end portions of the plate are provided with extension 14 fashioned to form bearings. That is these features 14 form the lower halves of bearings which cooperate with retaining caps 15 in holding the rotary or oscillatory shaft of the cutting means in place. The shaft is here denoted by the numeral 16 and is formed at one end with a laterally bent portion 17 functioning as a crank and provided with a handle or grip 18. This shaft carries balanced cutting means of a duplex or two-way type. That is to say on the intermediate part of the shaft and cooperating with the teeth 13 is a weighted body 19 somewhat in the nature of a tumbler. This provides for facility of operation the hand crank and shaft, provides the necessary counterbalancing weight and promotes rigidity in construction. Not only this it constitutes a mounting or supporting means for the cutting elements. The cutting elements are here shown as in the form of a plurality of longitudinally spaced cutting blades 20 of V-shaped form as shown in Figure 6. These are arranged at equidistant longitudinally spaced points and are adapted to swing between the teeth 12. Cooperating with these cutting blades is a single slicing knife whose cutting edge is denoted by the numeral 21 and whose transverse curved body portion is distinguished by the numeral 22. The end portions are indicated at 23 and these cooperate with the cutting elements 20 in forming a guard functioning as an appropriate safety device.

The gist of the invention is predicated upon a horizontal rectangular supporting plate for the food to be cut or diced, this having one edge portion provided with shaping teeth arranged for intimate cooperation with the inter-related cutting knives or elements 20 which do the principal cutting and which in turn cooperate with the secondary chopping or servering blade 21. The cooperation of the features 13, 20 and 21 together with a counterbalanced shaft arrangement provides the necessary easy operating and efficient cutting for dicing vegetables such as potatoes and the like as well as any other foods to be prepared for soup and other dishes. It will be noticed that the oscillatory cutting means is arranged beyond the teeth 13 so as to swing in proper position with respect to the teeth and to provide the necessary safety and clearance features.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

Having thus described my invention, what I claim as new is:

1. A device of the class described comprising a plate provided along one longitudinal edge with longitudinally spaced duplicate teeth, an oscillatory shaft having operating means, means mounting said shaft in spaced parallelism to the terminal ends of said teeth, and dicing means carried by said shaft and cooperable with said teeth, said means embodying a horizontally disposed transversely curved knife provided with a cutting edge engageable with the teeth, and a plurality of longitudinally spaced cutting blades cooperable with said knife and projecting down beyond said cutting edge and adapted for movement in the spaces between said teeth, and a counter weight mounted on said shaft to facilitate the actuation of the shaft in the dicing operation.

2. In a structure of the class described, a horizontal plate provided along one longitudinal edge of the longitudinally spaced duplicate teeth arranged in a plane even with each other, bearings on said plate at the opposite ends thereof projecting beyond said teeth, shafts mounted for rotation in said bearing, a crank for operating said shaft, a counterweight mounted on said shaft in alinement with said teeth, a yoke having its end portions attached to said weight having its intermediate portion of transversely curved form and its lower edge sharpened to provide a cutting knife engageable with the inner end portions of said teeth, and a plurality of V-shaped cutting blades spaced longitudinally in staggered relation with respect to said teeth carried by said weight and cooperable with the cutting edge and projectible beyond said edge to accomplish the desired cutting and dicing operation.

ROSARIO ST. PIERRE.